United States Patent [19]

Ferrara

[11] 3,943,000

[45] Mar. 9, 1976

[54] ALKYLENE OXIDE MODIFIED CEREAL FLOURS AND PROCESS OF PREPARING THE SAME

[76] Inventor: Peter J. Ferrara, Ridge Road, Cornwall, N.Y. 12518

[22] Filed: June 7, 1974

[21] Appl. No.: 477,486

[52] U.S. Cl. .................. 127/33; 106/114; 127/70; 260/233.3 R
[51] Int. Cl.² C13L 1/08; C08B 31/00; C08B 31/10; C04B 11/22
[58] Field of Search ............ 127/33, 32, 38, 69, 70; 260/233.3; 106/114

[56] References Cited
UNITED STATES PATENTS
2,516,634  7/1950  Kesler et al..................... 260/233.3
3,073,724  1/1963  Rankin et al. ........................ 127/38

*Primary Examiner*—Morris O. Wolk
*Assistant Examiner*—Roger F. Phillips

[57] ABSTRACT

The further modification of acid modified flours and starches by reacting such acid modified flours, at a pH of less than about 3.0 with an alkylene oxide, preferably ethylene oxide, in order to scavenge residual acidity, raise the pH of the product and partially crosslink it. The thus created new crosslinked product is useful in gypsum wall board core binders and other applications.

9 Claims, No Drawings

ALKYLENE OXIDE MODIFIED CEREAL FLOURS AND PROCESS OF PREPARING THE SAME

This invention relates to acid modified flours and starches. It more particularly refers to a technique for further modifying such to improve its properties.

It is known to improve the properties of starches and flours by treating them with mineral acids such as hydrogen chloride. U.S. Pat. No. 3,692,581, issued Sept. 19, 1972, shows how to further improve the flour and starch acid modifying techniques by using a mixture of hydrogen fluoride and another mineral acid.

Although acid modified flours and starches in general, and those prepared by the practice of the above-identified patent in particular, have received outstanding acceptance in several large volume commercial applications, the usefulness of these materials is often impaired by the acidic condition thereof. Since the acid modified products have an as produced pH in the range of 1.0 to 2.5 (measured as a 10% water slurry), they are corrosive even in the dry form. Such acid modified flours packaged and shipped in paper or even paperboard shipping containers are subject to considerable loss in transit through acid weakening of the containers.

It is, of course, conceivable to provide more acid resistant shipping containers and, thereby, avoid the transit loss problem. However, as the acid modified product is continually exposed to strongly acid conditions during transit, the properties thereof have been known to be altered to such an extent that it is no longer useful for its intended purpose.

Those well versed in the art of producing acid modified flours agree that the acid modification reaction ceases when the acid is removed. It is not even necessary to completely eliminate the excess acid, raising the acid modified flour (AMF) pH to about 3.2 to 3.5 appears to be sufficient. This pH adjustment has been accomplished or proposed in many ways. Purging or ventilation with inert gases and/or ammonia is a partial remedy, particularly with volatile acids such as the hydrohalogen acids. The AMF may be rapidly heated to drive off residual volatile acids. Excess acid has been neutralized with various conventional materials such as hydroxides, oxides, carbonates and phosphates. All of these techniques are more or less effective to reduce acid content and increase pH. However, neutralizing, as noted above, often produces a soluble salt product, e.g., sodium chloride from caustic and hydrochloric acid, which in and of itself raises an additional and different set of problems for the product.

One possible approach to this overall problem has been to neutralize the excess acid with a material so chosen that the material and its neutralization products are beneficial, or at least not detrimental, to the product formulation. In the U.S. Pat. No. 3,692,581, fine grained magnesium oxide was proposed for this use. The fixed magnesium salts produced by neutralization appear to have small or no observable side effects compared to other similar neutralizing materials. While magnesium oxide would appear to completely solve this problem, in that it is reasonably priced, easy to handle and abundantly available, the products derived from its use present disadvantages in certain applications.

It is known that the alkylene oxides are powerful acid scavengers in that they contain an epoxide linkage which has a great affinity for labile hydrogen. The lower alkylene oxides, particularly ethylene oxide and propylene oxide, have been used in the past as acid acceptors.

Alkylene oxides are organic chemicals which include an oxygen atom linked to two adjacent carbon-hydrogen groups as illustrated in the formula structure

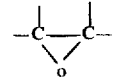

The reaction of these oxide units results from a break in the linkage between one of the carbon atoms and the oxygen so the hydroxy alkyl product has the structure of an ether. For this reason, scientists use the term hydroxyalkylation and etherification interchangeably.

For a complete picture of "STARCH ETHER" chemistry, one must begin with the outstanding work of Kesler and Hjermstad covered in three U.S. Pat. Nos. 2,516,632-3-4, all issued July 25, 1950. While all three patents were concerned with the "treatment of non-glutinous cereal starch", these inventors emphasized the essential requirement of alkaline conditions to bring about the formation of starch ethers. Without making a full review of the Kesler and Hjermstad Patents, several comments may be addressed to "the acid modified thin boiling starches" covered therein.

In U.S. Pat. No. 2,516,634, Kesler and Hjermstad, (column 5 - Lines 1–35) in the broad definition of their process make it abundantly clear that the acid modified starches depend on a treatment with sodium hydroxide plus a salt. When the combination includes sodium chloride a lower requirement than the normal level of sodium hydroxide is needed because — "This salt of neutralization may be used as part of the salt requirements for the present process of reacting starch with alkylene oxide — etc.". (Column 5 - Lines 31–35.

In the U.S. Pat. No. 2,516,632, Kesler and Hjermstad, still dealing with non-glutinous cereal starches in column 5 - Lines 26–40, present other interesting comments. One is relative to the rate of reaction between ethylene oxide gas and the dry cereal product. The rate of reaction (Line 27) "may be increased — by increasing the alkalinity of the dry product —". Then, beginning Line 34, (same Column 5) - "The acidity or alkalinity of the starting material does not effect the nature of the product formed provided the alkalinity or acidity is within the range of that of ordinary commercial starches, to which reference has heretofore been made". A rather surprising pH range of 4 to 10 is the "heretofore reference". Despite this statement, EXAMPLE 3, Column 7 deals with an acid modified, thin boiling cornstarch having a moisture content of 13.4%, and a pH in water suspension of 9.5 (Lines 6–9). It must be obvious to researchers having interest in hydroxyethylated, acid modified (HEAM) STARCHES, that the 9.5 pH reading could only be the result of having a reasonable excess of alkali, even though the reduced viscosity was first derived through acid modification.

In making a careful and thorough evaluation of the high quality work of these pioneers in STARCH ETHER Chemistry, the intent is not to demonstrate the existence of inconsistencies in the patent references, but rather to strongly emphasize that useful results were based on a balance of alkali and salt to achieve the reaction of starches with alkylene oxide. The message came through strongly enough to influence to a marked degree subsequent efforts to extend the teachings of Kesler and Hjermstad.

STARCH ETHER chemistry was given a major move forward in 1959 with U.S. Pat. No. 2,900,268 issued Aug. 18, 1959 to Rankin and Mehltretter. This work dealt with ethylene oxide treatment of corn and wheat flours which were first aged for 1 to 3 days with dry alkaline catalysts comprising sodium hydroxide and sodium carbonate. Continued scientific research on this same topic, originating in this Laboratory of the USDA at Peoria, Illinois, has resulted in additional patents and numerous articles. Despite the diverse range of studies aimed at acid modification and production of HEAMF (cereal based), the Peoria Laboratory reached conclusions reflecting a remarkable degree of consistency. For example in U.S. Pat. No. 3,073,724 issued Jan. 15, 1963, to Rankin etal., the patent claim (one only) is based on applications of acid modified pre-dried flours (moisture range 0.70% to about 1.40%) wherein the prime object is to produce flours containing the original amounts of undepolymerized amylose. Though the patent specification includes an imposing summary of experimental work with acid modified wheat flours and corn flours, some hydroxyethylated before and some after acid modification, it seems abundantly clear that the patentees faithfully practiced the same neutralization teachings of Kesler and Hjermstad, performing the neutralization of AMF with alkaline substances before converting these to HEAMF. In the instances where the hydroxyethylation treatment preceeded the acid modification step, the neutralization step was not an intervening step but the final one. Once again, the data supported the significance of the acidifying treatment applied "to pre-dried flours — 0.70 percent to 1.40% moisture".

One further quote from the U.S. Pat. No. 3,073,724, Rankin etal., is worth noting. This one states, Column 4, Lines 64–70 — "the pregelatinized acid modified flours as well as the pastes of the proprietary ungelatinized acid modified starch and of the proprietary pregelatinized starch which we had modified with acid in the manner of this invention formed gels and are, therefore, not usable in modern continuous and high speed sizing and coating operations".

It is, therefore, an object of this invention to provide novel means of acid modifying flours and starches, referred to herein collectively as flour.

It is another object of this invention to provide novel means of neutralizing acid modified flours.

It is a further object of this invention to provide novel means of further modifying acid modified flours.

Other and additional objects of this invention will become apparent from a consideration of this entire specification including the claims hereof.

In accord with and fulfilling these objects, one aspect of this invention resides in treating acid modified flours directly with at least one lower alkylene oxide in such quantity as to raise its pH from the 1.0 to 2.5 level to the 3.2 to 3.8 level. It is important to note that the post modification process hereof is carried out directly on acid modified flour with no intermediate neutralization. It has surprisingly been found that unneutralized acid modified flour not only is beautifully neutralized by alkylene oxide addition, but that the neutralization products stay in the reaction mass and further modify the acid modified flours in a most unexpected and advantageous manner.

In one series of exploratory experiments, taking careful note of the wide flammability and explosive limits ascribed to ethylene oxide (E.O.) we employed a mixture of 80% $CO_2$ and 20% E.O. The reaction of E.O. and HCL results in the formation of ethylene chlorhydrin, and the reaction may be written as follows:

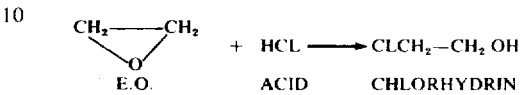

In the exploratory trials the pH of the HEAMF increased at a pace giving evidence of a rapid tieing up of the acid component. The $CO_2$-EO gas mixture was drawn through a reducing pressure valve attached to a high pressure cylinder of OXYFUME-20, through a helical coil submerged in hot water (to prevent condensation) directly into the bottom of 12 WIDE BY 30 LONG PADDLE MIXER of CARBON STEEL charged with 30 lbs. of acid modified flour. The paddles were adjusted to tumble the contents as well as to cause movement of the AMF from one end of the mixer to the other and back again. Anticipating some violent reaction, the mixer cover was vented to the air and the cover loose fitting though gasketed. In a lengthy series of tests each more drastic, trying to uncover the point where the reaction could be matched with the dire predictions suggested by several researchers, we failed to do more than scavenge the acidic ions as measured by the changes in pH readings.

The entire process of what was happening became even more mystifying when we took several samples of HEAMF and checked these for CHLORHYDRIN content by extraction of the HEAMF with isopropyl alcohol (IPA). The most sensitive test is the application of the P. W. MORGAN method of determining Hydroxyalkyl Groups — IND. ENG. CHEM., ANAL. ED. 18,500 (1946) and subsequently modified by Harlan J. LORTZ ANAL. ED. 28, No. 5, May 1956. Modifications were made by LORTZ to apparatus, sample size and the quantity of hydriodic acid to improve the determination of starch ethers in the range of 0.005 to 0.20 hydroxyalkyl group per anhydroglucose unit. This range of substitution (as will be shown, encompasses what may be ascribed to our HEAMF). Comparison of E.O. content of HEAMF, before and after IPA extraction showed practically no change, less than a 2% reduction.

Having established that chlorhydrin is quickly formed, becomes an integral portion of the starch molecule (the most likely chlorinated ether linkage occurring at the C-6 position — as usually numbered by starch chemists, the Carbon 6 is shown as $CH_2OH$ directly above C-5), the question still to be answered is whether all the E.O. applied is reacted with the HCL, and, if not, how much is used up to form E.O. polymers or starch crosslinks. The answers provide another measure of the unexpected.

We took a sample of AMF (corn) modified with 0.80 lbs. of HCL plus 0.02 lbs. of HF per 100 lbs. of corn flour. The Brabender peak viscosity of a cooked paste containing 27% solids, showed a maximum of 160 BU with a 750 CmG. cartridge. The peak appeared at 87.5°C. The pH of a 10% slurry was 2.30. A sample of AMF was slurried in water and titrated with 0.10 N-

NaOH, in steps, until the pH was increased to 7.0. The variations in titration versus pH were recorded and plotted as a graph, thus at any pH reading, the quantity of free acid remaining could be determined.

Then, sufficient E.O. was reacted to raise the pH of the HEAMF to 4.23. From the titration data as plotted, the residual free acids in the HEAMF were 0.27% showing some 0.55 of the original 0.82% acid value has reacted with E.O. Calculating the free acid disappearance as reacted, E.O. equivalent becomes 0.66%. However, when the ethylene oxide content is determined by the LORTZ METHOD, we account for 0.85% E.O. Thusly, we determine that 21% of the E.O. brought to the reaction is used up forming cross-links or polymers of E.O. and 79% is in the form of the chloro ether at the C-6 position (most likely).

The visual evidence of hydroxethylation and cross-linking is shown in the cooked paste. Whereas the original flour at 27% solids (175 grams OF FLOUR SLURRIED IN 400 ml. of water) showed a peak viscosity of 160 BU at a temperature of 87.5°C, after converted to HEAMF, the viscosity was raised to 210 BU but the peaking temperature was lowered to 83.5°C. (The tests with the C. W. Brabender Amylo/VISCO/GRAPH were made at 27% solids to bring out the changes which would have been less apparent at 20% solids).

The cooked HEAMF pastes were smooth without any signs of retrogradation. It is apparent the E.O. treatment has greatly enhanced the dispersibility of the protein component.

In another case of acid modified corn flour, one which was reacted with HCL until the viscosity at 27% solids was lowered to 20 BU, after treating with ethylene oxide to a pH of 6.5, the paste viscosity was increased to 50 BU. In this case, the temperature at which the peak occurred was lowered by 9.5°C instead of the 4.0°C applying to the previous example. The residual free HCL was less than 8% of the original quantity. Once again, the assay by the LORTZ METHOD revealed that approximately 30% of the E.O. used was converted to form cross-links and polymers, so its consumption was not strictly the conversion of E.O. to a chloride scavenger.

Additional tests conducted with acid modified milo and acid modified wheat flours in the same manner as applied to corn flours, showed similar results in the HE substitution range of 0.01–0.20 mols. of E.O. per anhydroglucose unit. While we might expect acid modified flours could conceivably give rise to greater consumption of 0.20 mol. of E.O. per anhydroglucose unit, to accomplish this one would have to use much larger quantities of the acidifying agents than customarily used to produce commercial grades of AMF.

HEAMF grades were obtained at a range of pH values from 3.20 up to 8.10. At the levels above 7.0 pH, the pH increase is most likely the result of reactions between the reactive anion portions in the mineral ash, and E.O., giving rise to the release of free alkali. The reactions of E.O. and AMF grades were made at temperatures ranging from 10 to 80. These temperatures apply to the main body of the AMF being treated. Reactions took place smoothly and uniformily under conditions of sub-atmospheric pressure (down to 7 PSIA) as well as atmospheric conditions. The AMF grades were sometimes agitated while E.O. was being introduced, and in some cases, the AMF consisted of a stationary bed with varying depths up to 5 FEET.

From the numerous tests made, it is evident the reaction of the alkylene oxides with the acid component depends largely on bringing the reactants together. As the reaction occurs, the rapid initial reaction gives off a large amount of heat in a very localized zone, and this increases reaction velocity. By intensive mixing of the ingredients, the reaction heat is quickly dissipated through the surrounding mass of flour. We have found the reaction between alkylene oxides, and acid modified flours to be exothermic but not hazardous when the reactants are constantly being mixed. At the degree of substitution which has been our main objective, 0.01 to 0.20 mols. of E.O. per anhydroglucose unit, the reactions can be accomplished in 15 minutes, or less, with ease.

A number of commercial tests already made with the HEAMF produced in accordance with the general procedures outlined herein, have produced concrete evidence these HEAMF grades have unique properties, highly desirable in gypsum wallboard core binders, binders and sizes in paper coatings, an ingredient in corrugator pastes and similar uses.

The use of alkylene oxides to modify and neutralize acid modified flours and starches has been shown. The alkylene oxides are suitably lower alkylene oxides having up to about six (6) carbon atoms therein. It is preferred to use ethylene oxide or propylene oxide with ethylene oxide being the most preferred.

Suitable proportions of alkylene oxide addition are about 0.30 to 2.50 pounds per 100 pounds of acid modified flour or starch, preferably about 0.65–1.30 pounds per 100 pounds. This amount of E.O. is an effective and yet economic range when the free acid content of the flour is approximately 0.65–2.0 lbs. of HCL or equivalent per 100 pounds of flour. Suitable addition conditions are about 15° to 70°C, preferably about 30° to 50°C. Since the neutralization-modification reaction is exothermic, it should be carried out with agitation and at an alkylene oxide rate of addition of up to about 2 to 5 pounds per hour per 100 pounds of flour or starch. The neutralization-modification reaction is, in the case of ethylene oxide addition, a gas-solid phase reaction in which the gas, ethylene oxide alone or admixed with suitable diluents such as carbon dioxide, passes through a bed of flour or starch particles. The passage may be upflow or downflow, as desired. It is within the scope of this invention to provide for gas upflow through the particulate acid modified flour or starch at a rate so as to fluidize the particles and thereby provide for intimate mixing of them with the alkylene oxide gas. Of course, mechanical mixing may be used, if desired.

What is claimed is:

1. In the process of modifying flours and starches by treating such with acid to produce an acid modified product having a pH of up to about 2.5, when measured in a 10% water slurry; the improvement which comprises directly reacting said acid modified flour or starch with a lower alkylene oxide in a proportion sufficient to raise the pH of the reaction product up to, at least, about 3.5.

2. The process of claim 1 wherein each molecule of said alkylene oxide has up to about 6 carbon atoms therein.

3. The process of claim 1 wherein said alkylene oxide is ethylene oxide.

4. The process of claim 1 wherein the pH of the acid modified product is about 1 to 2.5.

5. The process of claim 1 including employing about 0.3 to 2.5 pounds of alkylene oxide per 100 pounds of flour or starch.

6. The process of claim 1 including employing about 0.65 to 1.3 pounds of alkylene oxide per 100 pounds of flour or starch.

7. The process of claim 1 carried out at a temperature of about 15° to 70°C.

8. The process of claim 1 carried out at a temperature of about 30° to 50°C.

9. The product of the process of claim 1.

* * * * *